United States Patent
Schmidt-Thuemmes et al.

(10) Patent No.: US 8,637,160 B2
(45) Date of Patent: Jan. 28, 2014

(54) POLYMER DISPERSIONS OF VINYLAROMATIC COMPOUNDS AND ACRYLATE MONOMERS PREPARED IN THE PRESENCE OF SEED LATEX AND CARBOHYDRATE COMPOUNDS

(75) Inventors: Juergen Schmidt-Thuemmes, Neuhofen (DE); Elitsa Evstatieva, Mannheim (DE); Aurelie Morel, Paris (FR); Dirk Lawrenz, Hassloch (DE); Hermann Seyffer, Heidelberg (DE)

(73) Assignee: BASF SE, Ludwigshafen (DE)

( * ) Notice: Subject to any disclaimer, the term of this patent is extended or adjusted under 35 U.S.C. 154(b) by 272 days.

(21) Appl. No.: 13/157,779

(22) Filed: Jun. 10, 2011

(65) Prior Publication Data

US 2011/0305916 A1 Dec. 15, 2011

Related U.S. Application Data

(60) Provisional application No. 61/354,268, filed on Jun. 14, 2010.

(51) Int. Cl.
*B32B 23/04* (2006.01)

(52) U.S. Cl.
USPC ........ 428/532; 524/432; 524/734; 428/537.5; 428/402

(58) Field of Classification Search
USPC ................ 524/432, 734; 428/402, 532, 537.5
See application file for complete search history.

(56) References Cited

U.S. PATENT DOCUMENTS

| | | | | |
|---|---|---|---|---|
| 3,234,302 A * | 2/1966 | Wacome | | 525/261 |
| 5,147,907 A * | 9/1992 | Rinck et al. | | 524/48 |
| 5,358,998 A * | 10/1994 | Wendel et al. | | 524/734 |
| 5,536,779 A * | 7/1996 | Wendel et al. | | 525/54.26 |
| 8,003,716 B2 * | 8/2011 | Evstatieva et al. | | 524/52 |
| 8,329,803 B2 * | 12/2012 | Evstatieva et al. | | 524/432 |
| 8,530,563 B2 * | 9/2013 | Evstatieva et al. | | 524/432 |
| 2005/0176878 A1 * | 8/2005 | Ettl et al. | | 524/571 |
| 2010/0204382 A1 | 8/2010 | Evstatieva et al. | | |
| 2011/0091733 A1 | 4/2011 | Feuerhake et al. | | |
| 2011/0100575 A1 | 5/2011 | Schmidt-Thuemmes et al. | | |
| 2011/0108226 A1 | 5/2011 | Schmidt-Thuemmes et al. | | |
| 2011/0143156 A1 | 6/2011 | Cimpeanu et al. | | |
| 2011/0189487 A1 | 8/2011 | Zacharias et al. | | |
| 2011/0237744 A1 | 9/2011 | Ren et al. | | |
| 2011/0281130 A1 | 11/2011 | Evstatieva et al. | | |
| 2012/0148855 A1 | 6/2012 | Cimpeanu et al. | | |
| 2012/0276399 A1 | 11/2012 | Evstatieva et al. | | |

FOREIGN PATENT DOCUMENTS

| | | |
|---|---|---|
| DE | 198 10 903 A1 | 9/1999 |
| EP | 0 536 597 A1 | 4/1993 |
| WO | WO 99/09251 A1 | 2/1999 |
| WO | WO 2009/047233 A1 | 4/2009 |
| WO | WO2009/123637 * | 10/2009 |
| WO | WO 2009/123637 A1 | 10/2009 |
| WO | WO 2009/156341 A1 | 12/2009 |
| WO | WO 2010/000726 A1 | 1/2010 |
| WO | WO 2010/000728 A1 | 1/2010 |
| WO | WO 2010/020581 A2 | 2/2010 |
| WO | WO 2010/060863 A1 | 6/2010 |
| WO | WO 2010/094641 A1 | 8/2010 |
| WO | WO 2011/023587 A2 | 3/2011 |
| WO | WO 2011/095444 A1 | 8/2011 |
| WO | WO 2011/117308 A1 | 9/2011 |

OTHER PUBLICATIONS

U.S. Appl. No. 13/129,327, filed May 13, 2011, Evstatieva, et al.

* cited by examiner

*Primary Examiner* — Leszek Kiliman
(74) *Attorney, Agent, or Firm* — Oblon, Spivak, McClelland, Maier & Neustadt, L.L.P.

(57) ABSTRACT

Described are aqueous polymer dispersions and methods of making them. The polymer dispersions are obtainable by free-radically initiated emulsion polymerization of 19.9 to 80 parts by weight of vinylaromatic compounds, 19.9 to 80 parts by weight of acrylate monomers selected from C1-C10 alkyl acrylates and C1-C10 alkyl methacrylates, 0.1 to 10 parts by weight of ethylenically unsaturated acids, and 0 to 20 parts by weight of other ethylenically unsaturated monomers, wherein the emulsion polymerization is effected in an aqueous medium in the presence of free-radical initiators, seed latex and also at least one carbohydrate compound in the form of a degraded starch. The polymer dispersions are particularly useful in the manufacture of paper coating slips.

22 Claims, No Drawings

POLYMER DISPERSIONS OF VINYLAROMATIC COMPOUNDS AND ACRYLATE MONOMERS PREPARED IN THE PRESENCE OF SEED LATEX AND CARBOHYDRATE COMPOUNDS

This invention relates to aqueous polymer dispersions and to methods of making them. The polymer dispersions are obtainable by free-radically initiated emulsion polymerization of vinylaromatic compounds, certain acrylate monomers, ethylenically unsaturated acids and optionally further ethylenically unsaturated monomers, wherein the emulsion polymerization is effected in an aqueous medium in the presence of initiators, seed latex and also at least one carbohydrate compound.

EP-A 0 536 597 discloses aqueous polymer dispersions obtainable by free-radical emulsion polymerization of unsaturated monomers in the presence of at least one starch degradation product prepared by hydrolysis of native starch or chemically modified starch in an aqueous phase and having a weight average molecular weight Mw of 2500 to 25 000. Unsaturated monomers used include, for example, monomer mixtures comprising 50% to 100% by weight of esters of acrylic acid and/or methacrylic acid with alcohols having 1 to 12 carbon atoms and/or styrene, or 70% to 100% by weight of styrene and/or butadiene. The polymer dispersions are used as a binder, as an adhesive, as a sizing agent for fibers or in the manufacture of coatings. These products are not satisfactory on state-of-the-art, high-speed paper coating machines since they develop a high blade pressure.

WO 99/09251 discloses a starch copolymer product and a method for its preparation. The starch copolymer product is the reaction product of starch and one or more monomers capable of undergoing free-radical polymerization. To prepare aqueous dispersions of such products, an aqueous solution or dispersion of a degraded starch which in aqueous solution has an intrinsic viscosity η of 0.07 to 0.35 dl/g at a temperature of 25° C. is used. The polymerization is conducted by heating the aqueous solution or dispersion of the degraded starch to the polymerization temperature and first adding to it a portion of the monomers and of the free-radical initiator and, after the polymerization has been initiated, adding further portions of monomers and initiator wherein at least 75% of the total monomer is added more than one hour after initiation of the polymerization. The dispersions are used in the manufacture of coatings and as a binder for paper products. However, the binding force of such products is insufficient.

WO 2009/123637 discloses paper coating compositions comprising a copolymer prepared by polymerization of unsaturated monomers in the presence of carbohydrates having a dextrose equivalent of 10 to 35.

Known binders for paper coating slips based on copolymers of vinylaromatic compounds and further monomers, prepared in the presence of carbohydrate compounds are still not entirely satisfactory. Binders based on styrene and butadiene have the disadvantage that their synthesis can give rise to undesirable by-products such as, for example, 4-phenylcyclohexene (4-PCH), the Diels-Alder addition product of styrene and butadiene, or 4-vinylcyclohexene (4-VCH), a butadiene dimer. Copolymers of this type can therefore only be used in applications requiring particularly high purity and product safety—for example, the manufacture of food packaging or drink cartons—to a limited extent or following costly and inconvenient purification. Further important properties for use in paper coating agents are a very high pick resistance, a very low viscosity at high shear and a very low blade pressure at application of the coating slip to a paper web.

It is an object of the present invention to provide aqueous polymer dispersions providing high product safety which have a high binding force, a very high pick resistance, a very low viscosity at high shear and a very low blade pressure at application of a coating slip to a paper web.

We have found that this object is achieved according to the present invention by an aqueous polymer dispersion obtainable by free-radically initiated emulsion polymerization of
(a) 19.9 to 80 parts by weight of at least one vinylaromatic compound,
(b) 19.9 to 80 parts by weight of at least one acrylate monomer selected from C1-C10 alkyl acrylates and C1-C10 alkyl methacrylates,
(c) 0.1 to 10 parts by weight of at least one ethylenically unsaturated acid, and
(d) 0 to 20 parts by weight of at least one other ethylenically unsaturated monomer,
wherein the sum total of the parts by weight of monomers (a), (b), (c) and (d) is 100,
and wherein the emulsion polymerization is effected in an aqueous medium in the presence of free-radical initiators, seed latex and also at least one carbohydrate compound in the form of a degraded starch.

The present invention also provides a process for preparing aqueous polymer dispersions based on copolymers of vinylaromatics and acrylate monomers by emulsion polymerization of the monomers in an aqueous medium in the presence of a carbohydrate compound and of free-radical initiators, which process comprises the free-radically initiated emulsion polymerization utilizing
(a) 19.9 to 80 parts by weight of at least one vinylaromatic compound,
(b) 19.9 to 80 parts by weight of at least one acrylate monomer selected from C1-C10 alkyl acrylates and C1-C10 alkyl methacrylates,
(c) 0.1 to 10 parts by weight of at least one ethylenically unsaturated acid, and
(d) 0 to 20 parts by weight of at least one other ethylenically unsaturated monomer,
wherein the sum total of the parts by weight of monomers (a), (b), (c) and (d) is 100,
and wherein the emulsion polymerization is effected in an aqueous medium in the presence of free-radical initiators, seed latex and also at least one carbohydrate compound in the form of a degraded starch.

Vinylaromatic compounds are used as monomers in an amount of 19.9 to 80 parts by weight, preferably 25 to 70 parts by weight and more preferably 25 to 60 parts by weight, based on 100 parts by weight of monomers. Vinylaromatic compounds include, for example, styrene, α-methylstyrene and vinyltoluene. Preference is given to styrene, methylstyrene and their mixture. Particular preference is given to using styrene.

Acrylate monomers are used in an amount of 19.9 to 80 parts by weight, preferably 25 to 70 parts by weight and more preferably 25 to 60 parts by weight based on 100 parts by weight of monomers. The acrylate monomers are selected from C1-C10 alkyl acrylates and C1-C10 alkyl methacrylates. So the acrylate monomers in question comprise esters of acrylic acid and of methacrylic acid with monohydric C1-C10 alcohols such as, for example, methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate or propylheptyl acrylate. The acrylate monomers are preferably selected from C1-C8 alkyl acrylates and C1-C8 alkyl methacrylates, more particularly from methyl acrylate, ethyl acrylate, n-butyl acrylate, ethylhexyl acrylate, propylheptyl acrylate and their mixture. n-Butyl acrylate is particularly preferred.

Ethylenically unsaturated acids are used as monomers in an amount of 0.1 to 10 parts by weight, preferably 0.2 to 8 parts by weight or 1 to 6 parts by weight, based on 100 parts by weight of monomers. Ethylenically unsaturated acids include, for example, ethylenically unsaturated carboxylic acids, ethylenically unsaturated sulfonic acids and vinylphosphonic acid. Ethylenically unsaturated carboxylic acids used are preferably $\alpha,\beta$-monoethylenically unsaturated mono- and dicarboxylic acids having 3 to 6 carbon atoms in the molecule. Examples thereof are acrylic acid, methacrylic acid, itaconic acid, maleic acid, fumaric acid, crotonic acid, vinylacetic acid and vinyllactic acid. Useful ethylenically unsaturated sulfonic acids include for example vinylsulfonic acid, styrenesulfonic acid, acrylamidomethylpropanesulfonic acid, sulfopropyl acrylate and sulfopropyl methacrylate. The ethylenically unsaturated acids can be used in the polymerization in the form of the free acids and also partially or fully neutralized with suitable bases. Preference is given to using aqueous sodium hydroxide solution, aqueous potassium hydroxide solution or ammonia as neutralizing agent.

Optionally, still further ethylenically unsaturated compounds other than the monomers mentioned hereintofore can be used. The further monomers can be used in amounts of 0 to 20 parts by weight, for example in an amount of 0.1 to 15 parts by weight or of 0.5 to 10 parts by weight per 100 parts by weight of the monomer mixtures. Further monomers include for example unsaturated nitriles such as, for example, acrylonitrile and methacrylonitrile; ethylenically unsaturated carboxamides such as, for example, acrylamide and methacrylamide; vinyl esters of saturated C1-C18 carboxylic acids, for example vinyl acetate; allyl esters of saturated carboxylic acids, vinyl ethers, vinyl ketones, dialkyl esters of ethylenically unsaturated dicarboxylic acids, N-vinylpyrrolidone, N-vinylpyrrolidine, N-vinylformamide, N,N-dialkylaminoalkylacrylamides, N,N-dialkylaminoalkylmethacrylamides, N,N-dialkylaminoalkyl acrylates, N,N-dialkylaminoalkyl methacrylates, vinyl chloride and vinylidene chloride.

The further monomers are preferably monoethylenically unsaturated. But it is also possible to use polyunsaturated monomers, more particularly crosslinking monomers having two or more ethylenic double bonds, for example alkanediol diacrylates, a specific example being butanediol diacrylate.

Preferably
(a) 25 to 70 parts by weight of styrene and/or of methylstyrene,
(b) 25 to 70 parts by weight of at least one acrylate monomer selected from C1-C8 alkyl acrylates,
(c) 1 to 6 parts by weight of at least one ethylenically unsaturated acid selected from acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate and sulfopropyl methacrylate, and
(d) 0 to 20 parts by weight of at least one other ethylenically unsaturated monomer are utilized,
wherein the sum total of the parts by weight of monomers (a), (b), (c) and (d) is 100.

One embodiment utilizes
(a) 25 to 60 parts by weight of styrene,
(b) 25 to 60 parts by weight of n-butyl acrylate,
(c) 1 to 6 parts by weight of acrylic acid and
(d) 0 to 20 parts by weight of at least one other ethylenically unsaturated monomer,
the sum total of the parts by weight of the monomers (a), (b), (c) and (d) being 100.

The emulsion polymerization preferably utilizes from 15 to 60 parts by weight, from 20 to 50 parts by weight or from 30 to 45 parts by weight of the carbohydrate compound per 100 parts by weight of the monomers to be polymerized. Useful starting starches for preparing the degraded starches to be used according to the present invention include all native starches such as starches from maize (corn), wheat, oats, barley, rice, millet, potato, peas, tapioca, sorghum or sago. Also of interest are those natural starches which have a high amylopectin content such as wax maize starch and wax potato starch. The amylopectin content of these starches is above 90%, usually in the range from 95 to 100%. Starches modified chemically by etherification or esterification can also be used for preparing the polymer dispersions of the present invention. Such products are known and commercially available. They are prepared for example by esterification of native starch or degraded native starch with inorganic or organic acids, their anhydrides or chlorides. Of particular interest are phosphated and acetylated degraded starches. The most common method to etherify starches consists in treating starch with organic halogen compounds, epoxides or sulfates in aqueous alkaline solution. Known starch ethers are alkyl ethers, hydroxyalkyl ethers, carboxyalkyl ethers and allyl ethers. The reaction products of starches with 2,3-epoxypropyltrimethylammonium chloride are also useful. Particular preference is given to degraded native starches, more particularly native starches degraded to maltodextrin or to glucose syrup. Further suitable starches include cationically modified starches, i.e., starch compounds having amino groups or ammonium groups. Degradation of the starches can be effected enzymatically, oxidatively or hydrolytically through action of acids or bases. Degraded starches are commercially available. However, it is also possible for a natural starch to be firstly degraded, for example enzymatically, in an aqueous medium and, after the enzymatic degradation has been stopped, for the emulsion polymerization of the monomers to be carried out according to the present invention in the resulting aqueous solution or dispersion of the degraded starch. The degraded starches have for example an intrinsic viscosity $\eta i$ of less than 0.07 dl/g or less than 0.05 dl/g. The intrinsic viscosity $\eta i$ of the degraded starches is preferably in the range from 0.02 to 0.06 dl/g. The intrinsic viscosity $\eta i$ is determined in accordance with DIN EN1628 at a temperature of 23° C.

The DE value is an alternative way to characterize the degree of degradation of starches which is very common in the field. DE denotes Dextrose Equivalent and refers to the percentage fraction of the dry substance which is attributable to reducing sugar. It corresponds to the amount of glucose (=dextrose) which would have the same reducing power per 100 g of dry substance. The DE value is a measure of how far polymer degradation has proceeded; hence products obtained having a low DE value retain a high proportion of polysaccharides and a low content of low molecular weight sugars, while products of high DE value are mainly made up of just low molecular weight sugars only. Preferred maltodextrins have intrinsic viscosities in the range of not less than about 0.04 to 0.06 dl/g, DE values of 3 to 20 and molar masses $M_w$ in the range from 15 000 to 20 000 g/mol. Preferred glucose syrup has intrinsic viscosities in the range from 0.02 to 0.04 dl/g, DE values in the range from 20 to 30 and molar masses $M_w$ in the range from 3000 to 6000 g/mol. Owing to their method of making, these products are obtained in the form of aqueous solutions and they are also commercialized as such. Suitable solutions of maltodextrins have solids contents of 50 to 70%, while suitable solutions of glucose syrup have solids contents of 70 to 95%. Especially maltodextrins, however, are also available in spray-dried form as a powder.

The polymer dispersions of the present invention are prepared by polymerizing the abovementioned monomers in the presence of seed latex. Seed latex is used in an amount of preferably 0.1% to 4% by weight and more preferably 1 to 3% by weight, based on the total amount of monomers.

The weight average particle diameter of the polymer seed used is preferably not more than 80 nm or not more than 60 nm and more particularly not more than 50 nm or not more than 40 nm, for example in the range from 20 to 40 nm. Determining the weight average particle diameter is known to a person skilled in the art and is effected via the method of the analytical ultracentrifuge for example. Weight average particle diameter herein is the weight average $D_{w50}$ value determined by the method of the analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). It is advantageous for the polymer seed used to be monomodal and to have a narrow particle size distribution. Narrow particle size distribution herein is to be understood as meaning that the ratio of the weight average particle diameter $D_{w50}$ and number average particle diameter $D_{N50}$ determined by the method of the analytical ultracentrifuge [$D_{w50}/D_{N50}$] is not more than 2.0, preferably not more than 1.5 and more preferably not more than 1.2 or not more than 1.1. The polymer seed is typically used in the form of an aqueous polymer dispersion. The aforementioned amounts are based on the polymer solids content of the aqueous polymer seed dispersion; they are therefore reported as parts by weight of polymer seed solids per 100 parts by weight of monomers. Preparing a polymer seed is known to a person skilled in the art and is typically effected by initially charging a relatively small amount of monomers and a relatively large amount of emulsifiers together with deionized water in a reaction vessel and adding a sufficient amount of polymerization initiator at the reaction temperature. The preference according to the present invention is for the use of a polymer seed having a glass transition temperature of not less than 50° C., not less than 60° C., not less than 70° C., not less than 80° C. or not less than 90° C. Particular preference is given to a polystyrene polymer seed or to a polymethyl methacrylate polymer seed.

In one possible embodiment of the process of the present invention, the polymerization reactor is initially charged with some or all of the polymer seed, with the remainder, if any, being added in the course of the emulsion polymerization. Preferably, all the polymer seed is initially charged to the polymerization reactor before initiation of the polymerization.

In one embodiment of the process of the present invention, at least 15% by weight of the initiator are initially charged in the aqueous medium together with the carbohydrate compound and the seed latex, the monomers and also the residual initiators being metered into this initial charge under polymerization conditions. It is also possible for 1% to 10% by weight of all the monomers to be polymerized to be included in the initial charge in addition to the initiator and the seed latex. The remaining monomers and the remaining initiator are then metered separately into the initial charge under polymerization conditions after the polymerization has started. Polymerization conditions are to be understood as meaning that the reaction mixture in the initial charge has been heated to the requisite temperature in which the polymerization takes place. These temperatures are for example in the range from 80 to 130° C. and preferably in the range from 90 to 120° C. Polymerization can also be carried out under superatmospheric pressure, for example at pressures up to 15 bar, for example in the range from 2 to 10 bar.

The process of the present invention typically utilizes initiators that form free radicals under the reaction conditions. Suitable polymerization initiators include, for example, peroxides, hydroperoxides, hydrogen peroxide, sodium persulfate, potassium persulfate, redox catalysts and azo compounds such as 2,2-azobis(4-methoxy-2,4-dimethylvaleronitrile), 2,2-azobis(2,4-dimethylvaleronitrile) and 2,2-azobis(2-amidinopropane) dihydrochloride. Examples of further suitable initiators are dibenzoyl peroxide, tert.-butyl perpivalate, tert.-butyl per-2-ethylhexanoate, di-tert-butyl peroxide, diamyl peroxide, dioctanoyl peroxide, didecanoyl peroxide, dilauroyl peroxide, bis(o-tolyl)peroxide, succinyl peroxide, tert-butyl peracetate, tert-butyl permaleate, tert-butyl perisobutyrate, tert-butyl perpivalate, tert-butyl peroctoate, tert-butyl perbenzoate, tert-butyl hydroperoxide, azobisisobutyronitrile, 2,2'-azobis(2-methylbutyronitrile), 2,2'-azobis(2,4-dimethylvaleronitrile) and 2,2'-azobis(N,N'-dimethyleneisobutyroamidine) dihydrochloride. Initiators are preferably selected from the group consisting of peroxodisulfates, peroxosulfates, azo initiators, organic peroxides, organic hydroperoxides and hydrogen peroxide. Particular preference is given to using water-soluble initiators, for example sodium persulfate, potassium persulfate, ammonium persulfate, sodium peroxodisulfate, potassium peroxodisulfate and/or ammonium peroxodisulfate. The polymerization can also be initiated by means of high-energy rays such as electron beams or irradiation with UV light.

The initiators are used for example in amounts up to 2% by weight, preferably at not less than 0.9% by weight, for example in the range from 1.0% to 1.5% by weight, based on the monomers to be polymerized. Preferably, at least 15% by weight of the initiators are initially charged in the aqueous medium together with the carbohydrate compound and the seed latex and the monomers and also the residual initiators are metered into this initial charge under polymerization conditions.

The polymer dispersions of the present invention are prepared by initially charging an aqueous solution of the above-described carbohydrate compound, seed latex and preferably at least 15% by weight of the total amount of initiator needed to, for example, a heatable reactor equipped with a mixing device. The amount of initiator in the initial charge is preferably not more than 90% by weight and usually not more than 60% by weight of the total amount required to polymerize the monomers. The carbohydrate compound effectuates good dispersal of the monomers and stabilization of the resulting finely divided polymers. In the course of the emulsion polymerization, the carbohydrate compound undergoes at least partial grafting and thereby becomes firmly incorporated in the resulting polymer.

To augment the dispersal of the monomers in the aqueous medium, the protective colloids and/or emulsifiers customarily used as dispersants can be used. A detailed description of suitable protective colloids is given in Houben-Weyl, Methoden der organischen Chemie, volume XIV/1, Makromolekulare Stoffe, Georg-Thieme-Verlag, Stuttgart, 1961, pages 411 to 420. Suitable emulsifiers include surface-active substances whose number average molecular weight is typically below 2000 g/mol or preferably below 1500 g/mol, while the number average molecular weight of the protective colloids is above 2000 g/mol, for example in the range from 2000 to 100 000 g/mol and more particularly in the range from 5000 to 50 000 g/mol.

Suitable emulsifiers include, for example, ethoxylated C8-C36 fatty alcohols having a degree of ethoxylation in the range from 3 to 50, ethoxylated mono-, di- and tri-C4-C12-alkylphenols having a degree of ethoxylation in the range from 3 to 50, alkali metal salts of dialkyl esters of sulfosuccinic acid, alkali metal and ammonium salts of C8-C12 alkyl sulfates, alkali metal and ammonium salts of C12-C18 alkylsulfonic acids and alkali metal and ammonium salts of C9-C18 alkylarylsulfonic acids. Cation-active emulsifiers are, for example, compounds having at least one amino or ammonium group and at least one C8-C22 alkyl group. When emulsifiers and/or protective colloids are used as auxiliaries to disperse the monomers, the amounts used thereof are for example in the range from 0.1% to 5% by weight, based on the monomers.

For modifying the properties of the polymers, the emulsion polymerization can optionally be carried out in the presence of at least one polymerization regulator. Examples of polymerization regulators are organic compounds comprising sulfur in bound form, such as dodecyl mercaptan, thiodiglycol, ethylthioethanol, di-n-butyl sulfide, di-n-octyl sulfide, diphenyl sulfide, diisopropyl disulfide, 2-mercaptoethanol, 1,3-mercaptopropanol, 3-mercaptopropane-1,2-diol, 1,4-mercaptobutanol, thioglycolic acid, 3-mercaptopropionic acid, mercaptosuccinic acid, thioacetic acid and thiourea. Further polymerization regulators are aldehydes such as formaldehyde, acetaldehyde and propionaldehyde, organic acids such as formic acid, sodium formate or ammonium formate, alcohols such as isopropanol in particular and also phosphorus compounds such as sodium hypophosphite. When a regulator is used in the polymerization, the amount of regulator used in each case is for example in the range from 0.01% to 5% and preferably in the range from 0.1% to 1% by weight, based on the monomers used in the polymerization. The regulators are preferably metered into the initial charge together with the monomers. However, they can also be partially or completely present in the initial charge. They can also be dosed in stages at different times to the monomers.

The emulsion polymerization takes place in an aqueous medium. The aqueous medium may comprise for example completely ion-free water or else mixtures of water and a miscible solvent such as methanol, ethanol or tetrahydrofuran. To polymerize the monomers, the first step is to prepare an aqueous solution of the degraded starch. This solution may optionally comprise a protective colloid and/or an emulsifier in dissolved form. The aqueous solution used as initial charge is preferably heated to the temperature at which the polymerization of the monomers is to take place, or to a temperature which is for example 5 to 20° C. below the polymerization temperature, before the initiator portion to be initially charged is included in the initial charge. The mandatory seed latex can be added selectively either to the cold initial charge or to the heated initial charge, in the latter case preferably before addition of the initial initiator charge. As soon as the particular polymerization temperature desired is reached or within the time span of 1 to 15 minutes, preferably 5 to 15 minutes after reaching the polymerization temperature, the metered addition of the monomers is commenced. They can be for example pumped into the reactor continuously within for example 60 minutes to 10 hours, usually within 2 to 4 hours. Adding the monomer in stages is also possible.

After the polymerization has ended, further initiator may optionally be added to the reaction mixture and a postpolymerization performed at the same temperature as the main polymerization or else at a lower or higher temperature. To complete the polymerization reaction, it will in most cases suffice to stir the reaction mixture at the polymerization temperature for example 1 to 3 hours after addition of all the monomers.

The pH in the polymerization can be for example in the range from 1 to 5. After polymerization, the pH is adjusted to a value of between 6 and 7 for example. Virtually coagulum-free aqueous dispersions are obtained.

In the aqueous polymer dispersion obtained, the dispersed particles have an average particle diameter of preferably 80 to 160 nm and more particularly 90 to 150 nm. The average particle diameter of the polymer particles can be determined by dynamic light scattering on a 0.005% to 0.01% by weight aqueous polymer dispersion at 23° C. by means of an Autosizer IIC from Malvern Instruments, England. The reported data are all based on the cumulant z-average diameter of the measured autocorrelation function as per ISO standard 13321.

In one embodiment, the solids content of the aqueous polymer dispersion according to the present invention is more than 55% by weight, for example at least 60% by weight. A corresponding solids content can be effected for example through appropriate adjustment of the water quantity and/or the monomer quantities used in the emulsion polymerization.

The aqueous polymer dispersions of the present invention can be used as a binder, an adhesive, a sizing agent for fibers, in the manufacture of coatings or in the manufacture of paper coating slips. The aqueous polymer dispersions of the present invention are useful both for sizing textile fibers and for sizing mineral fibers, more particularly glass fibers. Owing to their high adhesiveness, particularly when comonomers are used that lead to a low glass transition temperature for the copolymer (below 20° C. for example), they can also be used as an adhesive and in the manufacture of coatings. The aqueous polymer dispersions of the present invention are preferably used as binders in paper coating slips.

The present invention also provides a paper coating slip comprising
(i) inorganic pigments, and
(ii) an above-described aqueous polymer dispersion according to the present invention and optionally further added substances.

Paper coating slips, in addition to water, generally comprise pigments, binders and auxiliaries for setting the requisite rheological properties, for example thickeners. The pigments are typically dispersed in water. The paper coating slip comprises pigments in an amount of preferably at least 80% by weight, for example 80% to 95% by weight or 80% to 90% by weight, based on the total solids content. White pigments are contemplated in particular. Suitable pigments include, for example, metal salt pigments such as, for example, calcium sulfate, calcium aluminate sulfate, barium sulfate, magnesium carbonate and calcium carbonate, of which carbonate pigments, more particularly calcium carbonate are preferred. The calcium carbonate may be natural ground calcium carbonate (GCC), precipitated calcium carbonate (PCC), lime or chalk. Suitable calcium carbonate pigments are available for example as Covercarb® 60, Hydrocarb® 60 or Hydrocarb® 90 ME. Further suitable pigments include, for example, silicas, aluminas, aluminum hydrate, silicates, titanium dioxide, zinc oxide, kaolin, argillaceous earths, talc or silicon dioxide.

Suitable further pigments are available for example as Capim® MP 50 (Clay), Hydragloss® 90 (Clay) or Talcum C10.

The paper coating slip comprises at least one binder. The polymer dispersion prepared according to the present invention can be used in the paper coating slip as sole binder or in combination with further binders. The most important functions of binders in paper coating slips are to bind the pigments to the paper and the pigments to each other and to some extent fill voids between pigment particles. For every 100 parts by weight of pigments, the amount of organic binder used (in terms of binder solids, i.e. without water or other solvent liquid at 21° C., 1 bar) is for example in the range from 1 to 50 parts by weight, preferably in the range from 1 to 25 parts by weight or in the range from 5 to 20 parts by weight.

Useful further binders include natural-based binders, more particularly binders based on starch, and also synthetic binders other than the polymers prepared according to the present invention, more particularly emulsion polymers obtainable by emulsion polymerization. A binder based on starch is in this context to be understood as referring to any native, modified or degraded starch. Native starches can consist of amylose, amylopectin or mixtures thereof. Modified starches may comprise oxidized starch, starch esters or starch ethers. Hydrolysis can be used to reduce the molecular weight of the starch (degraded starch). Possible degradation products include oligosaccharides or dextrins. Preferred starches are cereal starch, maize starch and potato starch. Particular preference is given to cereal starch and maize starch and very particular preference is given to cereal starch.

The further synthetic binders other than the polymers prepared according to the present invention preferably consist of so-called principal monomers to an extent of at least 40% by weight, preferably to an extent of at least 60% by weight and more preferably to an extent of at least 80% by weight. The principal monomers are selected from C1-C20 alkyl(meth) acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, or mixtures thereof. Examples include alkyl(meth) acrylates having a C1-C10 alkyl moiety, such as methyl methacrylate, methyl acrylate, n-butyl acrylate, ethyl acrylate and 2-ethylhexyl acrylate. Mixtures of alkyl(meth)acrylates are also suitable in particular. Vinyl esters of carboxylic acids having 1 to 20 carbon atoms include, for example, vinyl laurate, vinyl stearate, vinyl propionate, vinyl versatate and vinyl acetate. Useful vinylaromatic compounds include vinyltoluene, α-methylstyrene, p-methylstyrene, α-butylstyrene, 4-n-butylstyrene, 4-n-decylstyrene and preferably styrene. Examples of nitriles are acrylonitrile and methacrylonitrile. Vinyl halides are chlorine-, fluorine- or bromine-substituted ethylenically unsaturated compounds, preferably vinyl chloride and vinylidene chloride. Specific examples of vinyl ethers are vinyl methyl ether and vinyl isobutyl ether. Preference is given to vinyl ethers of alcohols comprising 1 to 4 carbon atoms. Specific examples of hydrocarbons having 2 to 8 carbon atoms and one or two olefinic double bonds are ethylene, propylene, butadiene, isoprene and chloroprene.

Preferred principal monomers are C1-C10 alkyl(meth) acrylates and mixtures thereof with vinylaromatics, more particularly styrene, or hydrocarbons having 2 double bonds, more particularly butadiene, or mixtures of such hydrocarbons with vinylaromatics, more particularly styrene. In the case of mixtures of aliphatic hydrocarbons (more particularly butadiene) with vinylaromatics (more particularly styrene) the ratio can be for example between 10:90 to 90:10, more particularly 20:80 to 80:20. Particularly preferred principal monomers are butadiene and the above mixtures of butadiene and styrene.

In addition to the principal monomers, the emulsion polymer useful as a binder may comprise further monomers, for example monomers having carboxylic acid, sulfonic acid or phosphonic acid groups. Preference is given to carboxylic acid groups. Specific examples are acrylic acid, methacrylic acid, itaconic acid, maleic acid and fumaric acid. The level of ethylenically unsaturated acids in the emulsion polymer is generally below 10% by weight, preferably below 8% by weight and at least 0.1% by weight or at least 1% by weight. Further monomers include, for example, hydroxyl-containing monomers, more particularly C1-C10 hydroxyalkyl (meth)acrylates, or amides such as (meth)acrylamide.

When synthetic binders are used, natural binders such as starch can also be used, but are not mandatory.

Paper coating slips of the present invention may additionally comprise further additives and auxiliary materials, for example fillers, cobinders and thickeners to further optimize viscosity and water retention, optical brighteners, dispersants, surfactants, lubricants (e.g., calcium stearate and waxes), neutralizing agents (e.g., NaOH or ammonium hydroxide) for pH adjustment, defoamers, deaerators, preservatives (biocides for example), flow control agents, dyes (soluble dyes in particular), etc. Useful thickeners in addition to synthetic polymers (crosslinked polyacrylate for example) include particularly celluloses, preferably carboxymethylcellulose. Optical brighteners are, for example, fluorescent or phosphorescent dyes, particularly stilbenes.

The paper coating slip of the present invention preferably comprises an aqueous paper coating slip; water is present therein particularly due to the make-up form of the constituents (aqueous polymer dispersions, aqueous pigment slurries); the desired viscosity can be set by adding further water. Customary solids contents of paper coating slips range from 30% to 70% by weight. The pH of the paper coating slip is preferably adjusted to values in the range from 6 to 10, more particularly in the range from 7 to 9.5.

One embodiment of the invention relates to a paper coating slip wherein the polymers of the aqueous polymer dispersion prepared according to the invention are used in an amount of 1 to 50 parts by weight, based on the total amount of pigments, and wherein the pigments are present in an amount of 80 to 95 parts by weight, based on the total solids content and are selected from the group consisting of calcium sulfate, calcium aluminate sulfate, barium sulfate, magnesium carbonate, calcium carbonate, silicas, aluminas, aluminum hydrate, silicates, titanium dioxide, zinc oxide, kaolin, argillaceous earth, talc and silicon dioxide, and wherein the paper coating slip further comprises at least one auxiliary selected from the group consisting of thickeners, further polymeric binders, co-binders, optical brighteners, fillers, flow control agents, dispersants, surfactants, lubricants, neutralizing agents, defoamers, deaerators, preservatives and dyes.

The invention also provides paper or card coated with a paper coating slip of the present invention and also a process for coating paper or card, which comprises
    providing an aqueous polymer dispersion according to the invention; and
    using the aqueous polymer dispersion, at least one pigment and optional further auxiliaries to prepare a paper coating slip; and
    applying the paper coating slip to at least one surface of paper or card.

The paper coating slip is preferably applied to uncoated base papers or uncoated card. The amount is generally in the range from 1 to 50 g, and preferably in the range from 5 to 30 g (in terms of solids, i.e., without water or other solvent liquid at 21° C., 1 bar) per square meter. Coating can be effected by means of customary methods of application, for example via size press, film press, blade coater, air brush, doctor blade, curtain coating or spray coater. Depending on the pigment system, the paper coating slips of the present invention can be used for the basecoat and/or for the topcoat.

Paper coating slips according to the present invention have good performance characteristics. They have a high binding force, a high pick resistance, a low viscosity at high shear and a low blade pressure at application of a coating slip to a paper web. They are readily printable in the customary printing processes, such as relief printing, gravure, offset, digital, inkjet, flexographic, newsprint, letterpress, sublimation printing, laser printing, electrophotographic printing or a combination thereof.

EXAMPLES

Unless the context suggests otherwise, percentages are always by weight. A reported content is based on the content in aqueous solution or dispersion.

Solids contents are determined by drying a defined amount of the particular aqueous polymer dispersion (about 5 g) at 140° C. in a drying cabinet to constant weight. Two separate measurements are carried out in each case and averaged.

The average particle diameters of the polymer particles are determined by dynamic light scattering on a 0.005% to 0.01% by weight aqueous polymer dispersion at 23° C. by means of an Autosizer IIC from Malvern Instruments, England. The cumulant z-average diameter of the measured autocorrelation function (ISO standard 13321) is reported.

The following starting materials were used in the examples:
C PUR® 01910 degraded starch; Mw 10540-12640; DE=17-19; intrinsic viscosity 0.054 dl/g
C*Sweet® 01403 degraded starch; Mw 4000-6000; DE=28-32; intrinsic viscosity 0.026 dl/g
Dowfax® 2A1: emulsifier, alkyldiphenyl oxide disulfonate (45% strength in water)
Seed latex: aqueous polystyrene seed dispersion having an average particle size of 30 nm Inventive Example I1

The polymer dispersion is prepared in the same way as Example D23 of EP 536597, except that the reactor is initially charged with the following mixture:
213 g of water
33.75 g of a 33% by weight seed latex having an average particle size of 30 nm
90 g of C PUR® 01910 (20% by weight)
63 g of feed 1 and
37 g of feed 2
Feed 1:
247.5 g of n-butyl acrylate (55% by weight)
193.5 g of styrene (43% by weight)
9 g of acrylic acid (2% by weight)
pre-emulsified in 173 g of water with 4.5 g of a 20% by weight aqueous solution of a mixture of ethoxylated fatty alcohols (EO degree: 18, C16/18) (0.2% by weight)
Feed 2:
2.25 g of sodium peroxydisulfate (0.5% by weight) in 90 g of water A substantially coagulum-free polymer dispersion having a solids content of 50.4% and a particle size of 128 nm is obtained.

Comparative Example C1

The polymer dispersion is prepared in the same way as Example D23 of EP 536597. A substantially coagulum-free polymer dispersion having a solids content of 50.3% and a particle size of 225 nm is obtained Inventive Example I2

The reaction vessel is initially charged with a mixture of the following composition:
795 g of water
120 g of C PUR® 01910 (10% by weight)
109 g of 33% by weight seed latex having an average particle size of 30 nm
13.7 g of a 7% by weight aqueous solution of sodium peroxydisulfate The initially charged mixture is heated to 90° C. and maintained at 90° C. for 15 minutes. Thereafter, the remaining quantities of feeds 1 and 2 are added to the reaction zone continuously (feed 1 within 2.5 h, feed 2 within 2 h 45 min) starting at the same time, while 90° C. is maintained. This is followed by 15 minutes of postpolymerization and cooling down to room temperature.
Feed 1:
659 g of n-butyl acrylate (54.9% by weight)
491 g of styrene (40.9% by weight)
48 g of acrylic acid (4% by weight)
2.4 g of butanediol diacrylate (0.2% by weight)
pre-emulsified in 305 g of water with 36 g of a commercially available 15% by weight aqueous solution of sodium lauryl sulfate and 9.3 g of Dowfax® 2A1.
Feed 2:
54.9 g of a 7% by weight aqueous solution of sodium peroxydisulfate A substantially coagulum-free dispersion having a solids content of 49.6% and a particle size of 126 nm is obtained.

Comparative Example C2

A mixture consisting of:
833 g of water
120 g of C PUR® 01910 (10% by weight)
13.7 g of a 7% by weight aqueous solution of sodium peroxydisulfate
is heated to 90° C. and maintained at 90° C. for 15 minutes. Thereafter, the remaining quantities of feeds 1 and 2 are added to the reaction zone continuously (feed 1 within 2.5 h, feed 2 within 2 h 45 min) starting at the same time, while 90° C. is maintained. This is followed by 15 minutes of postpolymerization and cooling down to room temperature.
Feed 1 and Feed 2: as in Inventive Example I2.

A substantially coagulum-free dispersion having a solids content of 50.1% and a particle size of 255 nm is obtained.

Inventive Example I3

A reaction vessel is initially charged with a mixture having the following composition:
304 g of water
150 g of C*Sweet® 01403 (30% by weight)
20 g of a 33% by weight seed latex having an average particle size of 30 nm 35.7 g of a 7% by weight aqueous solution of itaconic acid (0.5% by weight)
21.4 g of a 7% by weight aqueous solution of sodium peroxydisulfate The initially charged mixture is heated to 92° C. Thereafter, the remaining quantities of feeds 1 and 2 are added to the reaction zone continuously (feed 1 within 3 h, feed 2 within 3.5 h) starting at the same time, while 90° C. is maintained. This is followed by 30 minutes of postpolymerization and cooling down to room temperature.
Feed 1:
275 g of n-butyl acrylate (55% by weight)
208 g of styrene (41.5% by weight)
15 g of acrylic acid (3% by weight)
pre-emulsified in 207 g of water with 11 g Dowfax® 2A1.
Feed 2:
50 g of a 7% by weight aqueous solution of sodium peroxydisulfate
A substantially coagulum-free dispersion having a solids content of 50.1% and a particle size of 150 nm was obtained.

Comparative Example C3

A mixture consisting of:
305 g of water
150 g C*Sweet® 01403 (30% by weight)
35.7 g of a 7% by weight aqueous solution of itaconic acid (0.5% by weight)
21.4 g of a 7% by weight aqueous solution of sodium peroxydisulfate is heated to 92° C. Thereafter, the remaining quantities of feeds 1 and 2 are added to the reaction zone continuously (feed 1 within 3 h, feed 2 within 3.5 h) starting at the same time, while 90° C. is maintained. This is followed by 30 minutes of postpolymerization and cooling down to room temperature.
Feed 1 and Feed 2: as in Inventive Example I3.
A substantially coagulum-free dispersion having a solids content of 49.4% and a particle size of 233 nm is obtained.
Coating Slip Preparation:
The coating slip was prepared in a stirred assembly (Deliteur) into which the individual components were fed in succession. The pigments are added in pre-dispersed form (as a slurry). The other components are added after the pigments, the order corresponding to the order in the recited coating slip formulation. The final solids content was set by adding water.
Coating Slip Formulation:
70 parts of finely divided carbonate
30 parts of finely divided clay
10 parts of coating slip binder from Examples I1 to I3 or C1 to C3
0.5 part of rheology modifier (carboxymethylcellulose)
Coating on the Pilot Plant:
The above-described coating slips are applied to uncoated wood-free base paper on BASF's pilot coating plant.
The following experimental parameters are chosen:
Solids content 66%
Low shear viscosity (Brookfield RVT, spindle 4, 100 rpm): 1200-1500 mPa s
Application method: blade-coating method
Base paper: wood-free, 70 g/m$^2$
Application rate: 10 g/m$^2$ each on both sides
Drying: by means of hot air and IR radiators to 4.5% residual moisture
High shear viscosity (Thermo-Haake RS 600) at 250 000 sec$^{-1}$: see table
Contact pressure of blade over contact pressure path in mm: see table The coated papers are subsequently calendered (90° C., 300 m/min, 200 kn/m line pressure) and cut to the suitable printing press size for a subsequent sheet-feed offset printing test.
Measurement of Dry Pick Resistance with IGT Tester (IGT Dry):
Strips were cut out of the in-test papers and printed with the IGT tester. The printing inks used are specific test inks from Lorillieux, which transmit different tensile forces. The test strips are fed through the press at continuously increasing speed (maximum speed 200 cm/s). To evaluate the result, the point at which 10 picks have occurred on the paper surface after the start of printing is determined on the sample printing strip. The measure reported for dry pick resistance is the speed in cm/sec present at this point during printing and also the test ink used. The higher this printing speed at the tenth pick point, the better the quality rating of the paper surface.
Offset Test:
Samples having a size of 240×46 mm are cut from the in-test papers in the longitudinal direction. An appropriate amount of printing ink is applied to the inking roll and left to run for 1 minute. A printing disk is then inserted and inked for 30 s. The printing speed is 1 m/s. A paper strip is brought back to the starting position on a printing test support with the printed paper strip. After a specified time interval, the printing process was started again without replacing the printing disk. This process is repeated several times. After each printing cycle, the pick on the printed side of the paper strip is assessed by visual inspection. The table reports the number of cycles before picking occurred for the first time. The higher the number of cycles up to the occurrence of picking, the better the suitability of the papers for offset printing.
Determination of Viscosity of Paper Coating Slips at High Shear:
The viscosity of the paper coating slips is measured in a Haake viscometer (Thermo-Haake RS 600) at a shear gradient of 250 000/s and a temperature of 23° C. Viscosity is reported in mPa s.

TABLE 1

| Dispersion | Particle size [nm] | Dry pick resistance [cm/s] | Offset cycles | Viscosity at high shear [mPa s] | Blade pressure in mm contact pressure path |
|---|---|---|---|---|---|
| I1 | 128 | 110 | 6 | 75 | 5 |
| C1 | 225 | 62 | 3 | 121 | 10 |
| I2 | 126 | 139 | >6 | 80 | 4 |
| C2 | 255 | 75 | 2 | 130 | 11 |
| I3 | 150 | 115 | 5 | 79 | 5 |
| C3 | 233 | 82 | 3 | 125 | 10 |

Printing slips prepared using the inventive polymer dispersion I1, I2 and I3 display distinct advantages over printing slips prepared with the comparative dispersions C1, C2 and C3 with regard to dry pick resistance, offset cycles, high shear viscosity and blade pressure.

US Provisional/Patent Application No. 61/354,268, filed Jun. 14, 2010, is incorporated in the present application by reference. Numerous modifications and variations of the present invention are possible in light of the above teachings. It is therefore to be understood that within the scope of the appended claims, the invention may be practiced otherwise than as specifically described herein.

We claim:
1. An aqueous polymer dispersion obtained by free-radically initiated emulsion polymerization of

(a) from 19.9 to 80 parts by weight of at least one vinylaromatic compound,
(b) from 19.9 to 80 parts by weight of at least one acrylate monomer selected from the group consisting of a C1-C10 alkyl acrylate and a C1-C10 alkyl methacrylate,
(c) from 0.1 to 10 parts by weight of at least one ethylenically unsaturated acid, and
(d) from 0 to 20 parts by weight of at least one additional ethylenically unsaturated monomer,
wherein a sum total of monomers (a), (b), (c), and (d) is 100, and the free-radically initiated emulsion polymerization is effected in an aqueous medium in a presence of a free-radical initiator, seed latex, and at least one carbohydrate compound in a form of a degraded starch.

2. The aqueous polymer dispersion of claim 1,
wherein a polymer particle has an average particle size of from 80 to 160 nm.

3. The aqueous polymer dispersion of claim 1,
wherein the at least one carbohydrate compound is a degraded starch having an intrinsic viscosity $\eta_i$ of less than 0.07 dl/g.

4. The aqueous polymer dispersion of claim 1,
wherein the at least one vinylaromatic compound is at least one selected from the group consisting of styrene and methylstyrene,
the at least one acrylate monomer is at least one selected from the group consisting of methyl acrylate, ethyl acrylate, n-butyl acrylate, ethylhexyl acrylate, and propylheptyl acrylate, and
the at least one ethylenically unsaturated acid is at least one compound selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate, vinylphosphonic acid, and a salt thereof, or
a combination thereof.

5. The aqueous polymer dispersion of claim 1, wherein the seed latex is polystyrene seed having an average particle diameter of from 20 to 40 nm.

6. The aqueous polymer dispersion of claim 1, wherein the free-radically initiated emulsion polymerization utilizes
(a) from 25 to 70 parts by weight of styrene, of methylstyrene, or a combination thereof,
(b) from 25 to 70 parts by weight of at least one acrylate monomer comprising a C1-C8 alkyl acrylate,
(c) from 1 to 6 parts by weight of at least one ethylenically unsaturated acid selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, and sulfopropyl methacrylate, and
(d) from 0 to 20 parts by weight of an additional ethylenically unsaturated monomer,
wherein a sum total of monomers (a), (b), (c), and (d) is 100.

7. The aqueous polymer dispersion of claim 1,
wherein the free-radically initiated emulsion polymerization utilizes from 15 to 60 parts by weight of the at least one carbohydrate compound per 100 parts by weight of the monomers and 0.1 to 4 parts by weight of the seed latex, based on a solid content of the seed latex, per 100 parts by weight of the monomers.

8. The aqueous polymer dispersion according to claim 1, wherein the at least one acrylate monomer is n-butyl acrylate.

9. A binder, an adhesive, or a sizing agent for a fiber comprising:
the aqueous polymer dispersion of claim 1,
wherein the binder, the adhesive or the sizing agent is suitable for manufacturing a coating or a paper coating slip.

10. A process for preparing an aqueous polymer dispersion based on at least one copolymer of at least one vinylaromatic and at least one acrylate monomer by emulsion polymerization of monomers in an aqueous medium in a presence of a carbohydrate compound and a free-radical initiator, the process comprising free-radically initiated emulsion polymerization utilizing
(a) from 19.9 to 80 parts by weight of at least one vinylaromatic compound,
(b) from 19.9 to 80 parts by weight of at least one acrylate monomer selected from a C1-C10 alkyl acrylate and a C1-C10 alkyl methacrylate,
(c) from 0.1 to 10 parts by weight of an ethylenically unsaturated acid, and
(d) from 0 to 20 parts by weight of at least one additional ethylenically unsaturated monomer,
wherein a sum total of monomers (a), (b), (c), and (d) is 100, and the emulsion polymerization is effected in an aqueous medium in a presence of a free-radical initiator, seed latex, and also at least one carbohydrate compound in a form of a degraded starch.

11. The process of claim 10,
wherein at least 0.9% by weight, based on total monomers, of the free-radical initiator is added and at least 15% by weight of the free-radical initiator is initially charged in an aqueous medium together with the at least one carbohydrate compound and the seed latex and the monomers and also residual initiator is metered into this initial charge under a polymerization condition.

12. The process according to claim 10,
wherein the at least one carbohydrate compound is a degraded starch having an intrinsic viscosity $\eta_i$ of less than 0.07 dl/g.

13. The process according to claim 10,
wherein the at least one vinylaromatic compound is at least one selected from the group consisting of styrene and methylstyrene,
the at least one acrylate monomer is at least one selected from the group consisting of methyl acrylate, ethyl acrylate, n-butyl acrylate, ethylhexyl acrylate, and propylheptyl acrylate,
the at least one ethylenically unsaturated acid is at least one compound selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate, vinylphosphonic acid, and a salt thereof, or
a combination thereof.

14. The process according to claim 10, wherein the seed latex is polystyrene seed having an average particle diameter of from 20 to 40 nm.

15. The process according to claim 10, wherein the emulsion polymerization utilizes
(a) from 25 to 70 parts by weight of styrene, methylstyrene, or a combination thereof,
(b) from 25 to 70 parts by weight of at least one acrylate monomer of a C1-C8 alkyl acrylate,
(c) from 1 to 6 parts by weight of at least one ethylenically unsaturated acid selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate and sulfopropyl methacrylate, and (d) from 0 to 20 parts by weight of at least one additional ethylenically unsaturated monomer, wherein a sum total of monomers (a), (b), (c), and (d) is 100.

16. The process according to claim 10, wherein the emulsion polymerization utilizes from 15 to 60 parts by weight of the at least one carbohydrate compound per 100 parts by weight of the monomers and 0.1 to 4 parts by weight of seed latex, based on a solid content of the seed latex, per 100 parts by weight of the monomers.

17. The process according to claim 10, wherein the free-radical initiator is sodium persulfate, potassium persulfate, ammonium persulfate, sodium peroxodisulfate, potassium peroxodisulfate, ammonium peroxodisulfate, or a combination thereof.

18. The process according to claim 10, wherein the at least one acrylate monomer is n-butyl acrylate.

19. A paper coating slip, comprising:
(i) an inorganic pigment, and
(ii) an aqueous polymer dispersion of claim 1.

20. The paper coating slip of claim 19, wherein the polymer of the aqueous polymer dispersion is used in an amount of 1 to 50 parts by weight, based on a total amount of the inorganic pigment, and wherein the inorganic pigment is present in an amount of 80 to 95 parts by weight, based on a total solid content and is selected from the group consisting of calcium sulfate, calcium aluminate sulfate, barium sulfate, magnesium carbonate, calcium carbonate, a silica, an alumina, aluminum hydrate, a silicate, titanium dioxide, zinc oxide, kaolin, argillaceous earth, talc and silicon dioxide, and the paper coating slip further comprises an auxiliary selected from the group consisting of a thickener, an additional polymeric binder, a co-binder, an optical brightener, a filler, a flow control agent, a dispersant, a surfactant, a lubricant, a neutralizing agent, a defoamer, a deaerator, a preservative, and a dye.

21. Paper or card coated with the paper coating slip of claim 20.

22. A process for coating paper or card, the process comprising:
providing the aqueous polymer dispersion according to claim 1;
preparing a paper coating slip with the aqueous polymer dispersion and at least one pigment, and optionally an additional auxiliary, thereby obtaining a paper coating slip; and
applying the paper coating slip to at least one surface of the paper or the card.

* * * * *